June 24, 1969
F. T. THOMPSON
3,452,258
DIGITAL-ANALOG FEEDBACK CONTROL SYSTEM EMPLOYING SOLID
STATE DIGITAL POTENTIOMETER
Filed Aug. 19, 1966
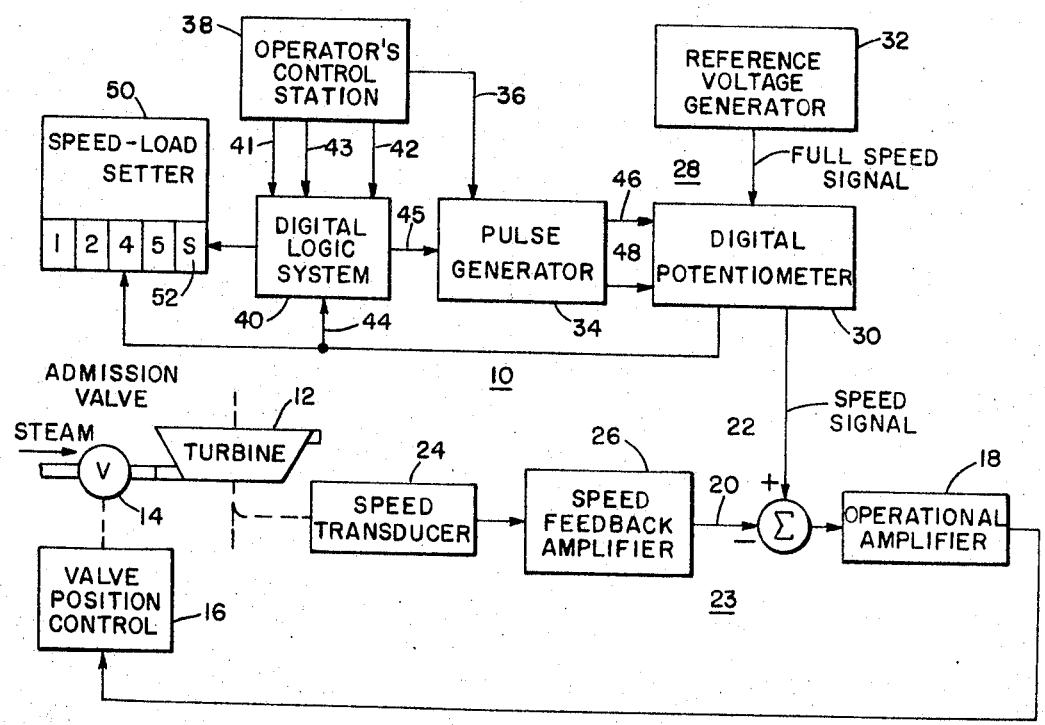
FIG. I
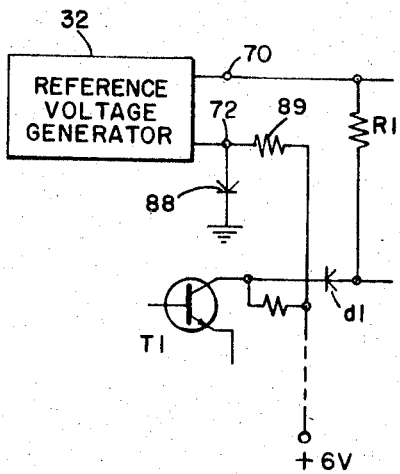
FIG. 3
WITNESSES
Helen M. Farkas
James F. Young
INVENTOR
FRANCIS T. THOMPSON
BY E. F. Possessky
ATTORNEY

United States Patent Office 3,452,258
Patented June 24, 1969

3,452,258
DIGITAL-ANALOG FEEDBACK CONTROL SYSTEM EMPLOYING SOLID STATE DIGITAL POTENTIOMETER
Francis T. Thompson, Penn Hills Township, Verona, Pa., assignor to Westinghouse Electric Corporation, Pittsburgh, Pa., a corporation of Pennsylvania
Filed Aug. 19, 1966, Ser. No. 573,663
Int. Cl. H02p 5/46; H04l 3/00
U.S. Cl. 318—18                     5 Claims

ABSTRACT OF THE DISCLOSURE

A digital current potentiometer is employed in a digital reference system for an analog feedback control. The potentiometer is connected across a high voltage source to carry a constant total current, and the fraction of the total current supplied to the potentiometer output and the fraction of the total current supplied through a bypass return are determined by the state of a control counter in the reference system.

Background of the invention

The present invention relates to digital-analog control systems and more particularly to steam turbine digital-analog control systems.

In digital-analog control systems where it is desired to obtain digital to analog conversion by a potentiometer process, it is often preferable to employ digital potentiometers rather than analog potentiometers in order to avoid problems of mechanical potentiometer wear and mechanical potentiometer non-linearity and thereby obtain increased accuracy and reliability. As described in a co-pending application entitled Digital Potentiometer and Control Therefor, Ser. No. 573,644, filed by J. F. Reuther on Aug. 19, 1966, and assigned to the present assignee, a digital potentiometer can be provided with a resistance circuit divided into two equal and series connected parts supplied by a voltage source. Individual resistors are interconnected in each part of the circuit and relay contacts are connected across the resistors for resistance control. One of the circuit parts thus provides an output voltage which is a controllable fraction of the source voltage.

Operation equivalent to that of a conventional potentiometer results from the fact that the total circuit resistance is held constant as the resistance of the output circuit part is varied to vary the output voltage. A counter is used with suitable coupling logic to control the relay contacts and the output voltage in accordance with the count in the counter at any point in time. To provide equivalency to a motor operated analog potentiometer, a variable rate pulse generator is connected to the counter to control the counting rate and hence the output voltage variation rate.

In a number of digital potentiometer applications including control system applications, even greater reliability is preferred over that obtained with a relay dependent digital potentiometer. Simple substitution of solid state switches for potentiometer relay logic contacts may in some cases suffice, but the substitutional technique often is either impractical or uneconomic. Thus, when combined in a digital-analog control system, a solid state digital potentiometer typically requires a basic design somewhat different from that of common relay type digital potentiometers. As a case in point, consider a digital-analog speed control system and in particular a digital-analog speed and acceleration or load control system like the one described in the aforementioned Reuther application which is particularly applicable to steam turbines in central utility stations, paper mills, and the like. Turbine speed is controlled by digital-analog control apparatus which provides steam valve position control in response to an operational error amplifier signal representative of the difference between the actual and set point turbine speeds. Acceleration and deceleration is provided by controlling the rate of change of the set point speed by a potentiometer process. Similarly, load control for a synchronously operating central station turbine is provided by a load set point signal which can be changed under rate control. Accordingly, in providing background description of this illustrative control system, reference will be limited to the speed control mode for the sake of convenience.

Speed control normally must be highly accurate and reliable and therefore must be substantially immune to extraneous variables such as ambient conditions, amplifier drift, power supply voltage and the like. At the same time, system accuracy and reliability should be obtained economically and efficiently for practical and commercial reasons.

System accuracy and reliability specifications typically would require that the turbine be controllably set at any speed within the range of 800 r.p.m. to about 4,000 r.p.m. with a maximum of 0.1% error. A further requirement typically would be that the turbine speed be changeable from one set point value to another at any of a predetermined number of rates and that the turbine speed be susceptible to hold action at any intermediate speed point. The accuracy and reliability of the system parts and the interaction among the system parts determine the overall system accuracy and reliability in meeting the system functional operating requirements.

To provide an acceptable balance between accuracy and reliability considerations and cost considerations, essential control functions are selectively produced by digital or analog techniques. For example, as further described in the aforementioned Reuther application, a relay operated digital potentiometer is used in a digital reference system to provide relatively accurate set point control (although as previously indicated reliability needs are not always adequately met by relay type digital potentiometers). On the other hand, the operational error amplifier is provided in an accurately operating analog form thereby avoiding costly digital error integration circuitry.

Reference is made to U.S. Patent 3,090,929, entitled, "Controller Circuitry With Pulse Width Modulator," and U.S. Patent 3,170,125, entitled, "Controller Circuitry," both of which issued to F. T. Thompson and describe a solid state pulse width modulator operational amplifier suitable for use in turbine speed control systems like the one described in the Reuther application. A similar operational error amplifier is generally described in an article entitled, "High-Accuracy Digital-Analog Solid-State Speed Controller," by F. T. Thompson in the March 1962 issue of A.I.E.E. publication, "Applications and Industry," pages 1–7. Other types of operational error amplifiers such as conventional high gain solid state DC amplifiers can also be used.

In order to minimize turbine system speed error due to operational error amplifier drift, a relatively high level error signal or voltage is developed through combination of the digital potentiometer output reference voltage and a speed feedback voltage at the amplifier input. System error due to amplifier drift is made negligible because typical amplifier drift voltages form a tolerable fraction of the high level error voltage associated with the smallest controllable speed error at the resolution limit of the control system.

To develop a high level error voltage at the amplifier input, it is necessary to produce an accurately fixed high level input reference voltage for the digital potentiometer and an accurate high level feedback voltage signal. The aforementioned A.I.E.E. article by F. T. Thompson also describes suitable circuitry and apparatus for meeting these systems needs. U.S. Patent 3,248,648, entitled, "Analog Reference and Error Detector," issued to F. T. Thompson et al. on Apr. 26, 1966, and assigned to the present assignee also describes a suitable system for generating accurate high level feedback signals similar to the ones described in the A.I.E.E. article.

Summary of the invention

To obtain economic improvement in potentiometer accuracy and reliability in applications like the described digital reference system, it is thus desirable that a digital potentiometer employ no relay logic and that it be arranged with relatively few and inexpensive low voltage solid state components. At the same time, improved control system accuracy and reliability can be realized by cooperative interrelation of the solid state potentiometer with other control system elements in the context of high level reference and feedback operating voltages. The present invention is directed to meeting these needs and in particular is directed to a high voltage level error signal digital-analog control system in which improved system accuracy and reliability are achieved by the cooperative incorporation of a solid state digital potentiometer.

In accordance with the broad principles of the invention, a high voltage level error signal digital-analog control system includes a solid state digital potentiometer comprising a digitally controlled counter having its output stages coupled to weighted resistive paths which are switchable to carry current to a potentiometer output terminal or through a bypass path in accordance with the state of the counter. Prefereably, switching is achieved by counter or buffer stage solid state switches which provide bias control of current directing solid state diodes coupled to the resistive paths. Internal voltage drop characteristics of the switches have substantially no effect on potentiometer accuracy, and diode leakage currents produce only negligible effects on potentiometer accuracy and linearity. Preferably, a single resistor is employed in each resistive path so that potentiometer control is produced with one resistor per bit.

In the high voltage level error signal control system, a digital reference system includes the accurately operating solid state digital potentiometer to provide an accurate variable set point signal. An accurately fixed high level reference voltage is applied across the weighted potentiometer resistive paths without placing expensive high voltage requirements on the solid state potentiometer switches and diodes. The reference voltage drives current through the potentiometer output terminal to develop in combination with a feedback current signal a high voltage level error signal which minimizes the effect of operational error amplifier drift on system accuracy.

It is therefore an object of the invention to provide a novel high level error voltage digital-analog control system which employs an economic and accurate solid state digital potentiometer so as to operate with improved system reliability and accuracy.

It is another object of the invention to provide a novel steam turbine speed and acceleration or load digital-analog control system which is readily adaptable to computer or remote load dispatching control and which employs a solid state digital potentiometer in a digital reference system to cooperate in developing a high voltage level error signal and thereby minimize operational error amplifier drift effects on system accuracy without requiring high voltage ratings for solid state components in the digital potentiometer.

These and other objects of the invention will become more apparent upon consideration of the following detailed description along with the attached drawings.

Brief description of the drawings

FIGURE 1 is a schematic diagram of a steam turbine speed and acceleration or load digital-analog control system in which the principles of the invention can be beneficially applied;

FIG. 3 shows a schematic diagram of a portion of another embodiment of the invention arranged to produce temperature compensation in a manner different from that produced by the circuitry shown in FIG. 2.

Description of the preferred embodiment

Figure 2:
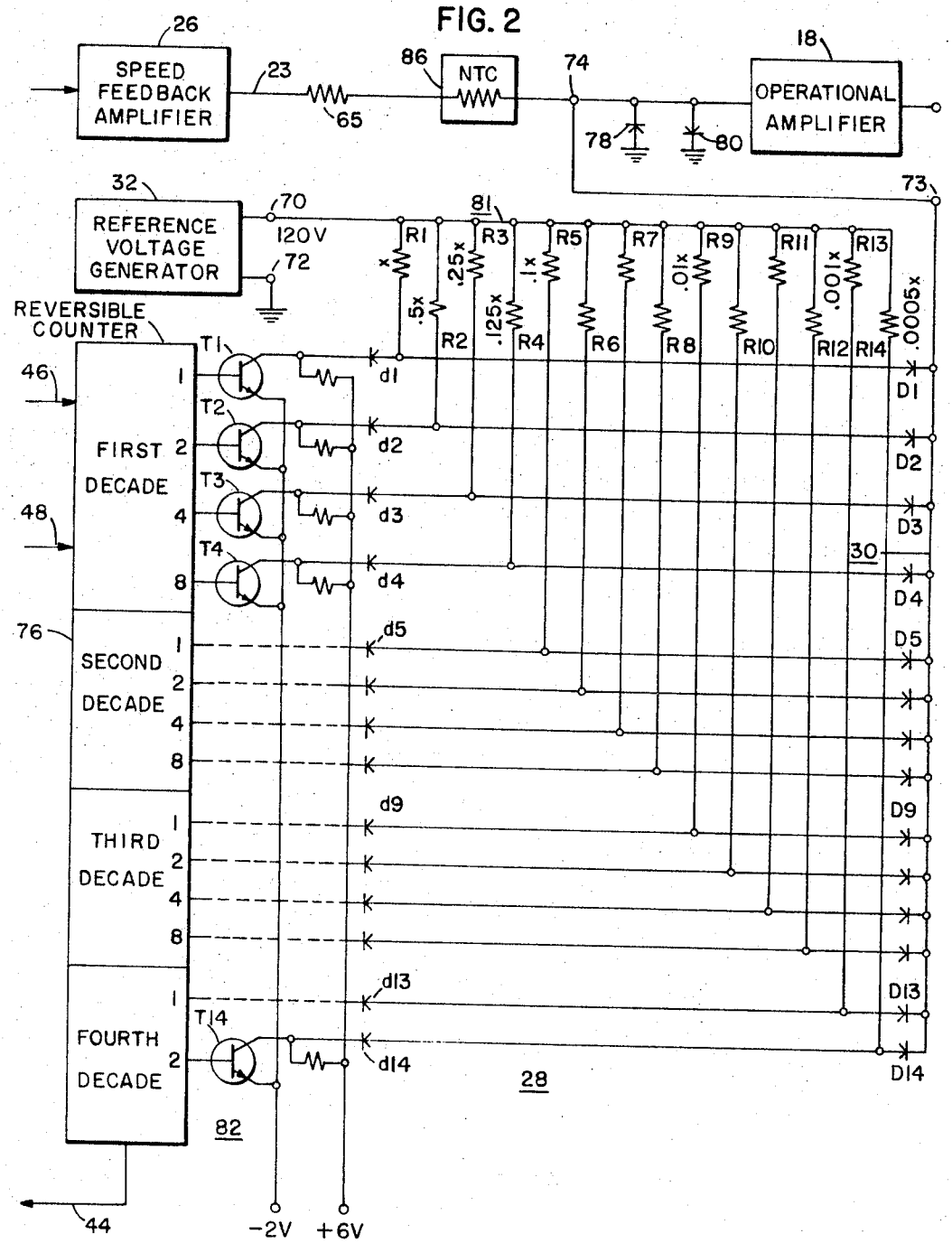
FIG. 2 shows a schematic diagram of a portion of the control system of FIG. 1 including a solid state digital potentiometer arranged in accordance with the principles of the invention.

More particularly, there is shown in FIG. 1 a digital-analog control system 10 arranged in accordance with the principles of the invention to control the speed and acceleration or load of a turbine 12 supplied in the usual manner with drive fluid or steam through an admission valve 14. A conventional control 16 varies the position of the valve 14 in response to an error signal output from an operational error amplifier 18 so as to drive the turbine to the set point speed or load condition. Electromechanical and electrohydraulic equipment directly employed to control drive fluid flow in a turbine or turbine apparatus can be relatively complicated, and it is shown herein in simple schematic form in order to illustrate a usage environment for the invention without overly complicating the description of the invention itself.

At the input of the operational error amplifier 18, a speed feedback signal is produced by a speed signal feedback network 23 as indicated by the reference character 20, an it is algebraically summed with a speed reference signal as indicated by line 22 so as to produce an error signal for amplification. The amplifier 18 can be formed from conventional circuitry such as that previously indicated by reference. To minimize system operating error due to possible drift in the amplifier 18, the speed error signal is generated at a relatively high voltage level by use of suitable means for generating a high voltage level and accurate feedback signal for summation with a high voltage level and accurate speed reference signal. If the turbine 12 is installed in a central utility station, load control is suitably provided by use of a feedback signal (not indicated) which is algebraically summed with a load mode reference signal on the line 22. The speed feedback speed signal 20 is then disconnected from the operational error amplifier 18.

In the speed feedback network 23, a speed transducer 24 such as a reluctance pickup device generates a voltage signal which is amplified to a relatively high voltage level by a speed feedback amplifier to produce accurately the high voltage level feedback speed signal 20. Conventional circuitry similar to that shown in the Thompson et al. Patent 3,248,648 can be used for this purpose.

A digital reference system 28 is employed for accurate generation of the speed reference signal 22. In general, the digital reference system 28 is similar to the system disclosed in the aforementioned copending Reuther application. The speed reference signal 22 is produced with highly accurate linearity and repeatability by a digital potentiometer 30 as a variable fraction of a fixed accurate reference signal supplied from a generator 32. In order to provide for a high voltage level error signal at the input of the operational amplifier 18, the reference voltage applied to the potentiometer 30 by the generator 32 can be as high as 250 volts or more but preferably is at a lower value such as 120 volts. Under typical operating conditions, the reference voltage supplied by the generator 32 would correspond to a set point speed of about 4,000 r.p.m. at the maximum output setting of the digital potentiometer 30. To generate the reference voltage accurately, the generator 32 can be provided in a form similar to that described in the aforementioned Thompson A.I.E.E article.

In general, the digital potentiometer 30 includes a reversible counter coupled to a resistance network to control the fraction of the generator reference signal which is supplied at the output of the potentiometer 30 as the speed reference signal 22. As subsequently explained more fully, the feedback speed signal and the potentiometer output signal are current signals generated from high voltage levels to minimize system error due to amplifier drift.

A pulse generator 34 such as a suitable unijunction transistor oscillator circuit (not shown) is connected to the digital potentiometer 30 to operate the counter in both the up and the down directions. The rate at which pulses are generated by the pulse generator 34 is controlled as indicated by the reference character 36 by suitable logic circuitry located in this instance at an operator's control station 38. As previously indicated, pulse rate control determines the counting rate in the digital potentiometer 30 and thereby the rate at which the speed reference signal 22 is changed to accelerate or decelerate the turbine 12.

The operator's control station 38 operates through a digital logic system 40 to provide other required or desirable operating functions. A preset speed is registered in a counter in the system 40 by suitable means as indicated by the reference character 42.

The control system 10 is then started by generation of a GO signal as indicated by the reference character 41. The pulse generator 34 accordingly begins operation and the digital potentiometer counter is operated to provide the speed reference potentiometer output signal control.

A reference feedack count from the potentiometer 30, as indicated by the reference character 44, is compared with the preset speed count after system startup so that operation of the pulse generator 34 is terminated when the counts in the potentiometer counter and the preset counter are equal. At that point, the speed reference signal 22 is accurately fixed to hold the turbine 12 at the preset operating speed within allowable speed error limits.

When desired, turbine speed can be placed in a hold condition by application of a STOP signal as indicated by the reference character 43 to the digital logic system 40. Under the STOP condition, the pulse generator 34 is made inoperative and the digital potentiometer counter is held at the count then existing. To terminate the hold condition the GO signal 41 is reapplied and the pulse generator 34 is reactivated to drive the digital potentiometer counter toward the preset speed count.

The difference between the preset speed count and the actual count in the digital potentiometer counter determines whether up or down counting is required to meet the preset speed count. The digital logic system 40 thus controls the pulse generator 34 as indicated by the reference character 45 to determine whether the output pulses are coupled to the potentiometer 30 through an upcounting channel 46 or a downcounting channel 48.

A digital display device as indicated by the reference character 50 is selectably operable to display the preset speed in the digital logic system 50 or the reference speed count in the digital potentiometer counter. The display device 50 can include four display areas which provide a direct digit reading of turbine speed in r.p.m. A fifth display area as indicated by the reference character 52 can display the letter S or the letter L to indicate whether the digital-analog system 10 is operating in the speed control mode or the load control mode. In order to facilitate direct digital display, BCD coding is preferably employed in the digital logic system 40 and the digital potentiometer 30 in the counting and count comparing processes.

If desired, the control system 10 is readily adapted to computer control or remote load dispatch control. For example, a digital computer (not shown) can be interfaced with the digital potentiometer counter so as to control the potentiometer count and counting rate in response to potentiometer counter feedback signals to the computer. As another example, the computer can be connected to control the operation of the pulse generator 34 in response to digital potentiometer counter feedback signals to the computer.

The speed range over which effective and accurate turbine speed control is provided by the system 10 can for example be 800 r.p.m. to about 4,000 r.p.m. with each pulse produced by the generator 34 corresponding to 1 r.p.m. The turbine acceleration or deceleration rate can be that corresponding to preselected pulse rates within the range of 50 to 2,000 pulses per minute. As previously indicated, typically specified accuracy is 0.1% within the predetermined turbine speed range which means that actual turbine speed should correspond to the potentiometer reference speed with a maximum error of 0.1% within the specified speed range.

In FIG. 2, there is shown in greater detail a portion of the digital-analog system 10 of FIG. 1 including the digital reference system 28, the speed signal feedback network 23 and the operational error amplifier 18 arranged and interrelated in accordance with the principles of the invention. The digital reference system 28 includes the digital potentiometer 30 arranged in solid state form and interrelated with the feedback network 23 and the operational error amplifier 18 to produce highly accurate and reliable turbine speed or load control with relatively high resolution. In general, the circuitry can be formed from separate components or monolithic or molecular circuitry or monolithic circuit blocks. Separate circuit components are preferably employed for reasons including that of economy.

Accurate and substantially linear potentiometer action is produced in the solid state digital potentiometer 30 by a current division process rather than the common voltage division process. Hence, the digital potentiometer 30 produces an output analog current as a controlled fraction of a high voltage level reference current as opposed to an output voltage as a controlled fraction of a high level reference voltage. By its arrangement and operation, the digital current potentiometer 30 provides certain system advantages when employed in digital-analog machine control systems and particularly in relatively high voltage level error signal turbine speed or load digital-analog control systems.

In the digital reference system 28, the accurate reference voltage generator 32 provides a reference voltage having a relatively high value such as 120 volts which is applied across the digital current potentiometer 30. In this instance, the reference voltage is applied across a potentiometer input terminal 70 and a common or ground return which, as indicated by the reference character 72, is substantially common to an output terminal 73 of the digital potentiometer 30 and an input junction 74 of the operational error amplifier 18. The latter junction combines the potentiometer output current signal with an output current signal of the feedback network 23 to operate as a current summing point input for the operational error amplifier 18. The feedback current signal is carried through a resistive circuit including a feedback speed resistor 65 which drops the high level feedback amplifier output voltage to the potential level at the junction 74.

The operating potential level of the junction 74 is ordinarily maintained at about the common or ground potential to assure substantially drift-free operation of the amplifier 64, and a back connected diode 78 and a forward connected diode 80 can be connected as shown to assure that the potential at the junction 74 is held within predetermined limits. Total current flow into the high potential potentiometer input terminal 70 is held substantially constant while potentiometer output current through the low potential output terminal 73 is varied according to the count in a reversible solid state counter 76 of conventional design.

Since the potentiometer drive voltage at the input terminal 70 and the feedback voltage at the output of the speed feedback amplifier 26 are at much higher levels than the potential level at the junction 74 in the predetermined speed range within which highly accurate control is to be provided, the algebraically summed current at the junction 74 is relatively large and changes in the summed current for small error changes in turbine speed at the system resolution limit are sizable. Minor or millivolt temperature or other normal variations in the potential at the junction 74 accordingly have tolerably little effect on potentiometer output current at a fixed potentiometer count since they are less than 0.1% of the total potentiometer voltage drop. The digital current potentiometer 30 thus is combined in the operational error generating sub-system to provide high system accuracy with solid state reliability.

Total potentiometer input current is carried by a plurality of parallel resistive paths in a resistance network 81. In this instance, a total of fourteen resistive paths are employed as determined by a preselected counting code. Potentiometer output current through the terminal 73 is controlled by solid state switching which directs individual resistive path currents through the potentiometer output terminal 73 or through alternate and essentially bypass return flow paths.

High potentiometer accuracy is facilitated by the employment of precision reference resistors R1 through R14 in the respective potentiometer resistive paths. The resistance value of each reference resistor is determined by the code weight accorded to it in the operating process. The reversible counter 76 is preferably arranged to count in multidecade BCD code in order to facilitate digital display, and the weights accorded to the reference resistors are thus made consistent with the preselected BCD counter code. Other codes such as straight binary can be employed if desired.

A solid state buffer 82 in this case couples the reversible counter 76 to the resistance network 81 in order to provide reduced loading on the counter 76. Each of four decades of the counter 76 has four internal count stages which are coupled to the resistance network 81 through four buffer solid state switches such as transistors. A total of fourteen transistors T1 through T14 are included in the buffer 82. Some buffer elements are omitted from the drawing to avoid unnecessary and confusing schematic complexity.

The collectors of the respective buffer transistors are coupled through bypass current directing diodes $d1$ through $d14$ to the resistive paths in the resistance network 81, and the buffer transistor collector-emitter paths provide the aforementioned bypass returns to the reference generator common terminal 72 for the potentiometer bit currents. When the buffer transistors are nonconductive, the bit currents in the potentiometer resistive paths are directed through potentiometer output current directing diodes D1 through D14 to the potentiometer output terminal 73.

The emitter potential of all the buffer transistors T1 through T14 is suitably held at a value which assures current flow through the bypass diodes $d1$ through $d14$ rather than the output diodes D1 through D14 when the buffer transistors are conductive. As indicated, the emitter potential can be held at about $-2$ volts. Similarly, the buffer transistor circuitry is arranged to hold the transistor collector terminals above a minimum value which allows the reference current to flow through the output diodes D1 through D14 when the transistors T1 through T14 are nonconductive. As indicated, a six volt supply can be connected through collector resistors to meet the collector voltage requirements.

The coded outputs of the reversible counter 76 are connected in the respective transistor base-emitter circuits to control the switching state of the buffer transistors T1 through T14 and accordingly the total potentiometer output current. If the buffer 82 is not used, respective solid state output switches (not shown) in the stages of each counter decade can be direct coupled to the resistance network 81. The collector and emitter potential conditions described for the buffer transistors T1 through T14 are also applicable to the counter transistors if the latter are direct coupled to the resistance network 81. However, the collector supply voltage may then be at a value greater than six volts such as at 24 volts in order to support greater loading caused by the display circuitry, feedback requirements, etc.

In operation, pulses are applied to the reversible counter 76 as described in connection with FIG. 1. Further, counter feedback is used as described in FIG. 1 to control the total number of pulses generated at the counter input. The pulse generation rate is also controlled to control the counting rate. As the count increases or decreases with the application of up pulses or down pulses at the counter input, the potentiometer analog output current increases or decreases by substantially equal increments. Linearity of the digital current potentiometer 30 can be 0.2% or better. Repeatability of current output for a particular count can be as good as .02% or better.

An upcounting process will illustrate the current potentiometer operation more specifically. Each of the four counter decades has four binary outputs corresponding to the aforementioned four internal stages and having decimal weights of 1, 2, 4 and 8 respectively. With a 0 count, all of the buffer transistors are normally conducting. On the count of 1 the 1 output in the first decade makes the buffer transistor T1 nonconductive and current from the resistor R1 is directed to the potentiometer output terminal 73 since the bypass diode $d1$ is then back biased. The resistor R1 has a value of $x$ thereby producing current of 1 unit. At the count of 2, the 2 output makes the buffer transistor T2 nonconductive to back bias the bypass diode $d2$, and the buffer transistor T1 returns to a conductive state with the bypass diode $d1$ again forward biased to divert current from the output diode D1. Potentiometer output current then equals 2 current units as determined by the resistor R2 which has a value of $0.5\times$. When the count reaches 3, both transistors T1 and T2 are made nonconductive and the potentiometer output current is equal to the sum of the currents through the resistors R1 and R2 or 3 current units. After the count has reached 9, the next counter input pulse causes the first decade to be reset and a 1 count is entered in the second decade. The transistor T5 (not shown) is then made nonconductive and total potentiometer output current equals 10 current units as determined by the resistor R5 which has a value of $0.1\times$.

Each time the first decade is upcounted through one cycle, the second decade is advanced to its next higher count. Similarly, each time the second decade is advanced through a complete cycle, it is reset and a count is entered in the next higher or the third decade. A similar relationship holds between the third decade and the fourth decade which is the highest order in the illustrated embodiment. Since the total count need not exceed 3999 in this embodiment, only the 1 and 2 outputs of the fourth decade are coupled to the buffer 82. Current leakage through the buffer transistors T1 through T14 is supplied by the collector resistors and therefore has substantially no effect on potentiometer accuracy as ambient temperature varies. However, back leakage current through the bypass diodes $d1$ through $d14$ can introduce some error which affects potentiometer accuracy and linearity. Leakage current through the bypass diodes $d1$ through $d14$ when back biased adds to current at the potentiometer output terminal 73 whereas leakage current through the output diodes D1 through D14 when back biased subtracts from current at the potentiometer output terminal 73. However, the resultant error is small, even with the least or nearly least inexpensive diode components. For example, 1N457 silicon diodes have a typical leakage of $1 \times 10^{-9}$ amperes at 25° C. At 60° C., total leakage current from the buffer 82 through the bypass diodes $d1$ through $d14$ would approximately equal $200 \times 10^{-9}$ amperes which is negligible compared with a typical full reference potentiometer output current of $6 \times 10^{-3}$ amperes through the terminal 74. Although it is normally not necessary to do so, diode components having a maximum leakage of $20 \times 10^{-12}$ amperes or less can be employed, but diode costs are then increased approximately tenfold or more.

In the digital-analog control system 10, changing temperature conditions can also cause the forward voltage drop across the diodes D1 through D14 to vary causing a drift in controlled speed. For example, over the range of 0° C. to 60° C., the change in the diode forward voltage drop can be approximately 120 millivolts. The drift in controlled speed thus would be relatively small since the change in the diode forward voltage drop is only about 0.1% of the 120 volt generator reference voltage.

Preferably, the resultant error effect, small as it may be, is substantially eliminated or reduced by at least an order of magnitude by connection of a negative temperature coefficient resistor 86 in series with the feedback resistor 65 in the feedback network 23. As shown in FIG. 3, the temperature induced error can be substantially eliminated in the alternative by connecting a diode 88 between the low voltage terminal of the reference generator 32 and ground, and suitably supplying the diode 88 with steady state current such as by connection through a resistor 89 to the six volt buffer bus. Changes in voltage across the diode 88 with temperature variation substantially cancel the effect of temperature changes in forward voltage across the output diodes D1 through D14.

It is thus apparent that potentiometer output current increases substantially linearly and accurately as the reversible counter 76 is upcounted. Downcounting performance is similarly accurate and linear. The controllable rate at which the counter 76 changes determines the rate at which the reference analog current at the terminal 73 changes and thus the rate at which the steam turbine changes speed to produce a change in the feedback speed current signal for an ultimate zero error condition at the summing junction 74. As previously indicated, the control 38 (FIG. 1) preferably provides for a plurality of predetermined counting rates which corresponds to turbine speed change rates within the predetermined boundaries of stable system dynamics.

Total current from the voltage generator 32 remains substantially constant at different counts since the lower potential end of the resistors R1 through R14 is clamped at a substantially fixed low voltage (such as within 2 volts of ground potential) as determined by the forward drop characteristic of the potentiometer bypass and output diodes. Variation in the generated reference voltage otherwise due to varying internal generation drop under different count conditions is thus substantially avoided. Accordingly, the digital current potentiometer 30 is arranged in such a manner that substantially constant loading is placed on the generator 32 thereby avoiding digital reference error and system operation error otherwise experienced.

The digital current potentiometer 30 is arranged to produce potentiometer action economically and efficiently. In particular, the solid state switches T1 through T14 are connected through the reference resistors R1 through R14 to a reference voltage and thus can be low voltage rated to achieve substantial cost savings over high voltage rated switches which would otherwise be required when a high reference voltage is used. In addition, the transistor saturation voltage drop has no threshold effect on bypass diode operation and therefore does not affect potentiometer accuracy with varying ambient temperature. Further, the same solid state switches used for potentiometer counting can be used for reference resistor switching although separate buffer solid state switches can be employed when circuit operating conditions make it preferable to do so.

Although the precision resistors R1 through R14 can be relatively expensive it is noteworthy that only one precision resistor is required for each bit of potentiometer resistance as opposed to the two resistors normally required for each bit of potentiometer resistance in a voltage potentiometer having constant total resistance. The potentiometer current directing diodes need not be expensive, but it is nonetheless noteworthy that only two diodes are required per bit of potentiometer resistance.

In the system 10, the accurate and economic solid state digital current potentiometer 30 is cooperatively interrelated with the feedback system 23 to produce a high voltage level error signal which minimizes system error due to operational error amplifier drift. Drift in potentiometer output current due to temperature changes or similar effects on the potentiometer circuit is small, but if desired can be compensated as previously described. Overall speed control accuracy of the system 10 can be 1 part in 10,000 or better over a temperature range of 0° C. to 60° C. with the advantages of solid state reliability.

The foregoing description has been presented only to illustrate the principles of the invention. Accordingly, it is desired that the invention not be limited by the embodiment described but, rather, that it be accorded an interpretation consistent with the scope and spirit of its broad principles.

I claim:

1. In a digital-analog control system having a relatively high voltage level error signal input to an operational error amplifier, a digital reference system comprising accurate high level reference voltage generator means, a solid state digital current potentiometer connected at the high voltage end thereof to a high reference voltage terminal of said voltage generator means, said current potentiometer including a solid state digital counter, said current potentiometer further including a plurality of solid state switches operative between conductive and nonconductive states to represent the counter state according to a predetermined code, a resistance network having a plurality of resistive paths weighted according to the code and commonly connected at high voltage ends thereof to the high reference voltage terminal of said voltage generator means, means for directing current from the low voltage end of each of said resistive paths in one of preselected and associated return paths to said generator means, said return paths associated with each of said resistive paths including a bypass return path through at least one of said switches and another output return path through a relatively low potential potentiometer output terminal, said switches controlling said directing means to direct return currents from said resistive paths through said bypass return paths or said output return paths in accordance with the counter state and thereby make the total potentiometer analog output current representative of the counter state, and a feedback network for accurately generating a feedback current signal from a high voltage, the output terminal of said potentiometer and the output of said feedback network coupled together to form a substantially fixed low voltage current summing point at the input of the operational amplifier.

2. In a turbine speed or load digital-analog control system having a relatively high voltage level error signal input to an operational error amplifier, the combination as set forth in claim 1 wherein said directing means includes respective solid state output diodes connected in said output return paths to couple the low voltage ends of said resistive paths to the potentiometer output terminal and respective solid state bypass diodes connected in said bypass return paths to couple the low voltage ends of said resistive paths to said switches.

3. In a turbine speed or load digital-analog control system having a relatively high voltage level error signal input to an operational amplifier, the combination as set forth in claim 1 wherein said current potentiometer further includes a buffer circuit coupling said counter with said resistance network, said switches form a part of said buffer circuit, said counter is a multidecade counter and a set of four of said buffer switches produce a 1, 2, 4, 8 BCD code as the preselected code representation for one of the counter decades, four of said resistive paths are resistance weighted in the order 8, 4, 2, 1 and respectively associated with the buffer switches in the 1, 2, 4, 8 set, and the remaining ones of said buffer switches and said resistive paths are interrelated in accordance with the 1, 2, 4, 8 BCD code and the decade value associated therewith.

4. In a turbine speed or load digital-analog control system having a relatively high voltage level error signal input to an operational amplifier, the combination as set forth in claim 2 wherein a negative temperature coefficient resistor carries the feedback current signal in a series path in said feedback network, and means for compensating for variations in leakage current in said output and bypass diodes.

5. In a turbine speed or load digital-analog control system having a relatively high voltage level error signal input to an operational error amplifier, the combination as set forth in claim 2 wherein means are provided for compensating for variation in the forward voltage drop across said potentiometer output diodes as a function of ambient conditions and a single precision resistor is connected in each of said resistive paths.

References Cited

UNITED STATES PATENTS

| | | |
|---|---|---|
| 2,738,504 | 3/1956 | Gray. |
| 2,870,429 | 1/1959 | Hales. |
| 2,878,397 | 3/1959 | Foster _____ 290—4.1 |
| 2,922,940 | 1/1960 | Mergler. |
| 3,248,622 | 4/1966 | Kelling. |

OTHER REFERENCES

Millman and Taub: "Pulse, Digital, and Switching Waveforms," 1965, McGraw-Hill, Inc., pp. 674–675.

ORIS L. RADER, *Primary Examiner.*

T. E. LYNCH, *Assistant Examiner.*

U.S. Cl. X.R.

137—30; 290—40; 318—28; 340—347